US008993493B2

(12) United States Patent
Mukai et al.

(10) Patent No.: US 8,993,493 B2
(45) Date of Patent: Mar. 31, 2015

(54) SLIDING PART MADE OF PB-FREE CU-BI BASED SINTERED ALLOY

(75) Inventors: Ryo Mukai, Toyota (JP); Hiromi Yokota, Toyota (JP); Kao Mouri, Toyota (JP)

(73) Assignee: Taiho Kogyo Co., Ltd., Aichi (JP)

( * ) Notice: Subject to any disclaimer, the term of this patent is extended or adjusted under 35 U.S.C. 154(b) by 1056 days.

(21) Appl. No.: 13/063,069

(22) PCT Filed: Sep. 9, 2009

(86) PCT No.: PCT/JP2009/066055
§ 371 (c)(1),
(2), (4) Date: May 23, 2011

(87) PCT Pub. No.: WO2010/030031
PCT Pub. Date: Mar. 18, 2010

(65) Prior Publication Data
US 2011/0224112 A1 Sep. 15, 2011

(30) Foreign Application Priority Data

Sep. 10, 2008 (JP) ................................. 2008-232467

(51) Int. Cl.
*C22C 9/00* (2006.01)
*F16C 33/12* (2006.01)
(Continued)

(52) U.S. Cl.
CPC .................. *C22C 9/02* (2013.01); *C22C 1/0425* (2013.01); *C22C 9/00* (2013.01); *C22C 9/04* (2013.01); *C22C 32/00* (2013.01); *F16C 33/24* (2013.01); *F16C 33/121* (2013.01); *Y02T 10/865* (2013.01); *F16C 2204/10* (2013.01)
USPC .............................. 508/103; 420/469; 75/246

(58) Field of Classification Search
USPC ............. 75/246; 508/103; 420/470, 472, 473, 420/483, 489, 497, 499
See application file for complete search history.

(56) References Cited

U.S. PATENT DOCUMENTS 6,132,487 A 10/2000 Mori
6,652,675 B2 11/2003 Sakai et al.
(Continued)

FOREIGN PATENT DOCUMENTS

EP 1 605 069 A1 12/2005
EP 1 787 741 A1 5/2007
(Continued)

OTHER PUBLICATIONS

Notification of Transmittal of Translation of the International Preliminary Report on Patentability (Form PCT/IB/338) of International Application No. PCT/JP2009/066055 mailed Apr. 28, 2011 with Forms PCT/IB/373 and PCT/ISA/237.
(Continued)

*Primary Examiner* — Roy King
*Assistant Examiner* — Jenny Wu
(74) *Attorney, Agent, or Firm* — Westerman, Hattori, Daniels & Adrian, LLP

(57) ABSTRACT

Sliding parts are made of Pb-free Cu—Bi based sintered material. The side in contact with a shaft is machined to a predetermined roughness. A number of Bi phases are present on the finished surface. Stable performance of Bi is to be exhibited. Machined sintered material covers a portion of the Bi phases. The ratio of the exposed surface area of the Bi phases is 0.5% or more relative to the area of the finished surface.

9 Claims, 6 Drawing Sheets

(51) Int. Cl.
   *B22F 9/00* (2006.01)
   *C22C 9/02* (2006.01)
   *C22C 1/04* (2006.01)
   *C22C 9/04* (2006.01)
   *C22C 32/00* (2006.01)
   *F16C 33/24* (2006.01)

(56) References Cited

U.S. PATENT DOCUMENTS

2003/0008169 A1　1/2003　Sakai et al.
2008/0193324 A1　8/2008　Sato et al.
2010/0266444 A1*　10/2010　Yokota et al. ................. 420/470

FOREIGN PATENT DOCUMENTS

| | | |
|---|---|---|
| EP | 2 048 253 A1 | 4/2009 |
| GB | 2355016 A | 4/2001 |
| JP | 4-028836 A | 1/1992 |
| JP | 10-330868 A | 12/1998 |
| JP | 2000-204401 A | 7/2000 |
| JP | 2001-220630 A | 8/2001 |
| JP | 2005-163074 A | 6/2005 |
| JP | 2005-350722 A | 12/2005 |
| JP | 2006-37180 A | 2/2006 |
| WO | 03/031102 A | 4/2003 |
| WO | 2006/008842 A1 | 1/2006 |
| WO | 2008/018348 A1 | 2/2008 |
| WO | WO 2008018348 A9 * | 6/2008 |

OTHER PUBLICATIONS

Extended European Search Report, issued in corresponding European Patent Application No. 09813174.1, mailed May 15, 2012 (6 pages).

International Search Report of PCT/JP2009/066055, date of mailing Dec. 28, 2009.

* cited by examiner

<CASE 1, CROSS SECTION>

<CASE 2, CROSS SECTION>

Cu MATRIX COVERS Bi PHASE

Cu MATRIX COVERS Bi PHASE

FIG. 7
<CASE 1, SURFACE>
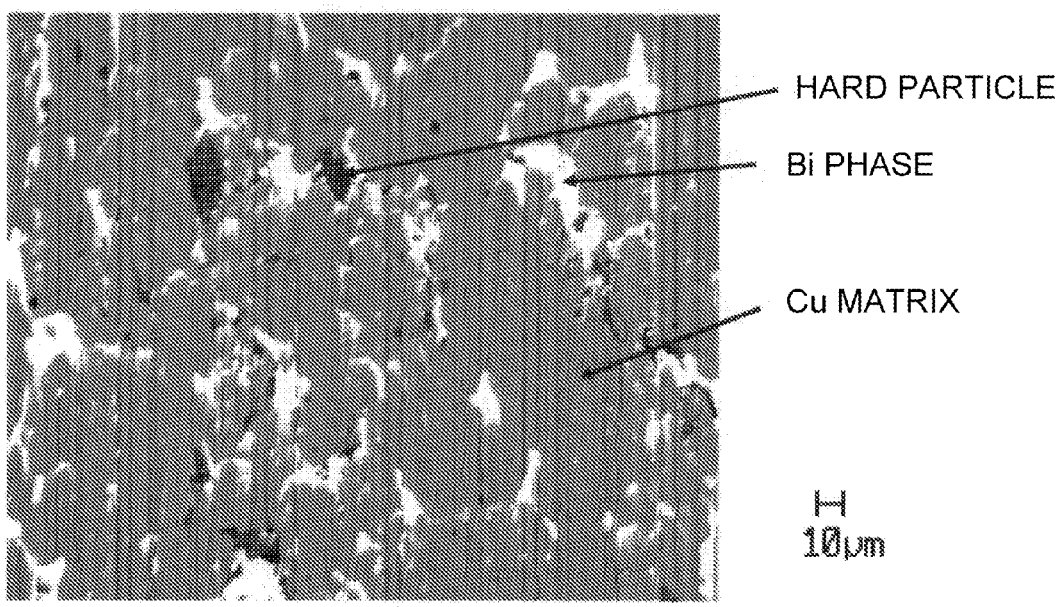
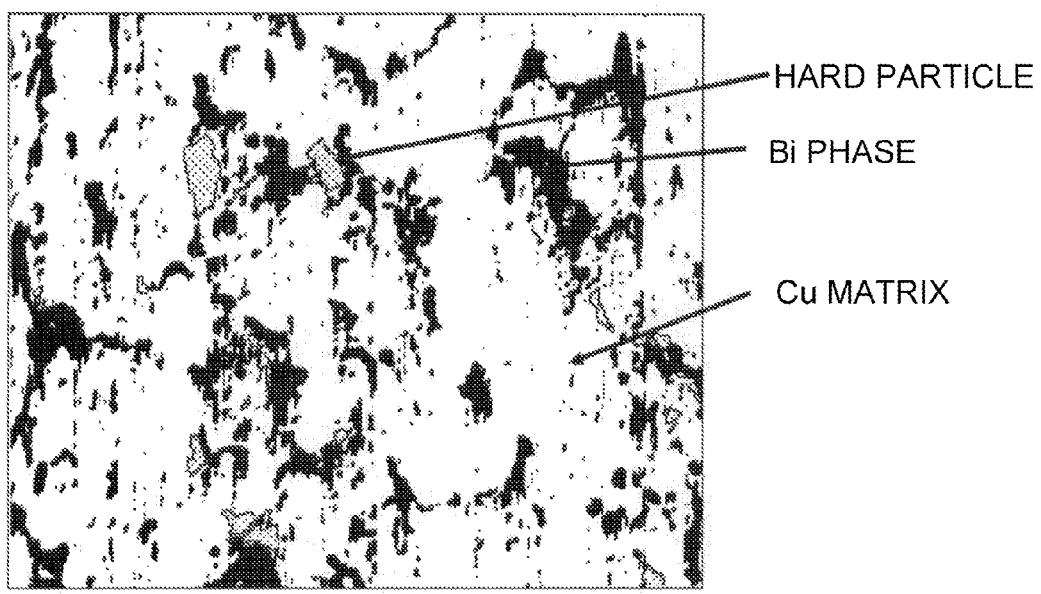

SLIDING PART MADE OF PB-FREE CU-BI BASED SINTERED ALLOY

TECHNICAL FIELD

The present invention relates to a sliding part with machined sliding surfaces of Cu—Bi based sliding material. It contains Bi, which is a soft metal, for the purpose of obtaining conformability, as a substitute for Pb, which is usually contained in a copper alloy for sliding application. In particular, the present invention pays attention to a point that these soft metals present on the surface of the sintered alloy influence the sliding properties. The inventive sliding parts made of Pb-free Cu—Bi based sintered alloy have thus been realized.

BACKGROUND TECHNIQUE

Patent Document No. 1: Japanese Unexamined Patent Publication (kokai) No. 2001-220630 discloses a Pb free Cu—Bi based sintered sliding material, in which 1 to 10% by weight of Bi phase is dispersed. Such intermetallic compounds as Ni—Si are present around the Bi-phase particles. Pb may also be present instead of or in addition to Bi. A sketch of the microscopic structure of a sintered material is shown in FIG. 1. The surface of the sliding material is finished by machining, and, subsequently, an overlay layer is deposited to provide a bearing.

Patent Document No. 2: Japanese Unexamined Patent Publication (kokai) No. 2005-350722, discloses a Pb-free Cu—Bi sintered sliding material, containing 1 to 30% Bi and 0.1 to 10% hard particles having an average particle diameter of 10 to 50 μm. The structure of the material is such that Bi phases finer than the hard particles are dispersed in the Cu matrix of the sintered sliding material. Microscopic photographs of the sintered material are shown in FIGS. 1-4. The surface of this Pb-free Cu—Bi based sintered material is paper-lapped to provide a ten-point average roughness of 1.0 μm.

Patent Document No. 3, WO 2008/018348, discloses a Pb-free Cu-based sintered sliding material, which contains 1 to 15% Sn, 1 to 15% Bi, and 1 to 10% hard particles having a particle diameter of 5 to 70 μm. All the hard particles are bonded to the copper matrix. As seen in FIGS. 1-4 of the microscope photographs, a number of Bi phases are dispersed in the sintered material.

The prior art publications mentioned above show, in their microscopic photographs and sketches, Bi phases, hard particles, a copper matrix and the like of sintered alloys. The materials are processed in successive steps, such as by cutting, rough polishing, fine polishing and buff polishing, thereby making the respective phases clearly apparent in the specimens prepared in this way for microscopic observation. Since Bi, Pb and the like are particularly soft, polishing is carefully carried out so that they are not shaved away nor flow them.

Conventional Cu—Pb based sliding materials have been recently replaced with Cu—Bi based sliding materials. In such a trend, Patent Document Nos. 1 through 3 focus on the characteristics of Bi from various points of view, including material cost, since Bi is more expensive than Pb, and hence the additive amount of Bi should be as low as possible.
Patent Document 1: Japanese Unexamined Patent Publication (kokai): No. 2001-220630
Patent Document 2: Japanese Unexamined Patent Publication (kokai) No. 2005-350722
Patent Document 3: WO 2008/018348

DISCLOSURE OF INVENTION

Problems to be Solved by Invention

According to the description of the Pb-free Cu—Bi based sintered sliding material in Patent Document Nos. 1 through 3, the effects of Bi are dependent on the additive mass % provided that structural morphology of Bi is specified. These patent documents presume that the structure shown in the drawings should be observed at any portion of a Cu—Bi based sintered sliding material. Such material can therefore be said to be homogeneous. In the homogeneous material, when an intended structure is specified, the effect of Bi is dependent upon additive amount of Bi.

The sliding surface of a bearing used for a transmission bush, an engine, or the like is machined, for example, by cutting, and finished to a predetermined surface roughness. A high-performance tool, such as sintered diamond, is frequently used for machining a Cu—Bi alloy. Sliding properties of wrought parts are greatly varied even if the Bi additive amount is identical and the Bi phase structure is identical in a Pb-free Cu—Bi based sintered sliding material. In some cases, the properties of materials with a large addition of Bi and those with a small addition of Bi become mutually identical. Therefore, when a Cu—Bi based sintered sliding material is evaluated as a whole including the wrought surface, it turns out that it is not homogeneous. The present inventors conducted further research and discovered that machining influences the surface condition of sliding parts which results in an unstable performance of Bi. Specifically, when a cutting tool shaves off the surface of copper alloy, a portion of the copper alloy that is separated from a work piece produces chips. Meanwhile, the material not removed by a cutting tool exhibits roughness and is subjected to shear stress by the cutting tool. It turned out that machining influences the dispersion morphology of the Bi phases and it is different from that in the sintered material body.

Therefore, an object of the present invention is to obtain stable performance of Bi in the sliding parts made of Pb-free Cu—Bi based sintered alloy.

Means for Solving the Problem

In accordance with the present invention, there is provided a sliding part made of a Pb-free Cu—Bi based sintered sliding material having a contacting surface finished to a predetermined roughness by machining and being in contact with a shaft, and a number of Bi phases are present on the finished surface, characterized in that a portion of the sintered material covers a portion of the Bi phases as a result of the machining, and, further, a total of the uncovered Bi phases has 0.5% or more of an exposure areal ratio relative to the finished surface.

The present invention is described hereinafter in detail. Since solid Bi and solid Cu virtually do not dissolve each other, Bi in a Cu—Bi sintered alloy is distributed by itself in a plurality of Cu crystal grain boundaries. Accordingly, Bi phases of the Cu—Bi sintered alloy are in the form of a number of particles, and reflect the contour of crystal grain boundaries mentioned above. Each of a number of the Bi particles is referred to herein as the Bi phase. Therefore, there are a number of the Bi phases on the finished surface of sliding parts made of sintered material.

Sliding parts made of the Pb-free Cu—Bi based sintered material are various, such as a bush for a transmission, a bush for a fuel injection pump, a plain bearing for an automotive engine, a bush for a machine tool, and a plain bearing for a marine engine. A sliding surface of these parts in contact with a shaft is wrought by a cutting tool such as sintered diamond, thermet, high-speed-steel, or a cemented carbide tool. The post-working surface usually has a roughness of approximately $Rz_{JIS}$ 0.5-5 µm. Alloy or material of the sliding parts is herein referred to as the sliding material.

The Cu—Bi based sintered material used for such Cu—Bi based sliding parts according to the present invention generally contains Bi in an amount of 0.5 to 15 mass %, preferably 2 to 10 mass %.

The following elements may further be included as optional component(s). For example, Sn, which enhances strength, may be included in 1 to 15 mass %, preferably 3 to 10 mass %. Ni, which also enhances strength, may be included up to 5 mass %. Ag, which is dissolved in solid Cu matrix, forms an Ag—Sn concentrated layer or a Bi—Ag eutectic, and may be included up to 5 mass %, preferably 0.1 to 1 mass %. P, which enhances sinterability, may be included up to 0.2 mass %. In, which is dissolved in the solid Cu matrix and enhances seizure resistance, may be included up to 10 mass %. Zn, which enhances strength and corrosion resistance, may be included up to 30 mass %. These elements may be included in combination. Preferably, the total amount of these elements is 40 mass % or less. Impurity elements and incidental elements other than the above-mentioned ones may also be included. Alternatively, an element may be added for purposes different from that for enhancing sliding properties. Fe, As, Sb, Mn, Al, Be, S, Ti or Si may be included in a small amount of, for example, 0.5 mass % or less.

In order to obtain enhanced sliding properties, hard particles may be present in an amount of 10 mass % or less, preferably 1 to 5 mass %, in the Cu—Bi based sliding parts. The hard particles may be Fe compounds, such as $Fe_3P$, $Fe_2P$, FeB and $Fe_2B$, AlN, NiB, $Mo_2C$, $Al_2O_3$ and the like, preferably the Fe compounds such as $Fe_3P$, $Fe_2P$, FeB and $Fe_2B$ and the like. The hard particles preferably have an average particle diameter of 1.5 to 70 µm. In addition, a solid lubricant, e.g., 10 mass % or less, preferably 1 to 3 mass % of $MoS_2$ or graphite, may be present.

The state of the Bi phases on the surface of Cu—Bi based sliding parts is most characteristic feature of the present invention. This feature is described hereinafter. A conventional Cu—Pb based sliding material contains a relatively large amount of Pb. That is, the Pb content is 5 to 30 mass %. Therefore, Pb tends to be extensively exposed on the wrought surface. Contrary to this, the Bi content of a Cu—Bi based sliding material is so low that Bi is not likely to be exposed on the wrought surface.

Surface of a Cu—Bi based sintered material was machined with a cutting tool. This material was then cut to show a cross section. FIG. 1 is a photograph showing the cross sectional structure. The Bi phases and Cu matrix shown in FIG. 1 are converted to a black and white binary schematic illustration in FIG. 2, respectively. A cutting tool was used to remove the surface of the material. The removed material was therefore present above the surface as shown in FIGS. 1 and 2. Cutting generates a shear stress and influences the structure of the cut surface, as is apparent from the comparison of the surface structure with the inner structure of the material body, which maintains a sintered structural state. Specifically, the cutting tool was displaced from the left side to the right side of the drawings, which exerted a shear stress to the sintered material in this direction. After cutting, the influence of cutting is apparent at portions where different phases are in contact with one another. In the Figs., three ovals indicate the position of Bi phases. Some Bi phases are elongated on the surface of the Cu matrix (hereinafter referred to as "Case 1"), or conversely, the Cu covers a Bi phase (hereinafter referred to as "Case 2").

FIG. 3 and FIG. 4, which is a binary (white-black) schematic illustration of FIG. 3, show similar cross sections, and correspond to Case 1. FIG. 5 and FIG. 6, which is a binary (white-black) schematic illustration of FIG. 5, correspond to Case 2. In Case 1, the Bi exposure on the wrought surface is larger than that predicted under assumption of homogeneous material. On the other hand, in Case 2, since the additive Bi exposure on the surface corresponds to only a part of the additive amount of Bi, the sliding properties commensurated with the additive Bi amount are not exhibited.

Now, a method for measuring the areal ratio of the exposed Bi on a Cu—Bi based sliding member is described. First, a post-machined member is degreased, washed and then a measurement specimen is sampled from the member. Bi is exposed on the surface of a specimen as shown in the upper half of FIG. 7 and upper half of FIG. 8, which show the results of observation of the surface under an electron microscope. The microphotographs are analyzed using an image analyzer to calculate the areal ratio of exposed Bi. In this process, polishing of a specimen changes the Bi phases such that their presence on the surface of a sample is different from that before polishing. Therefore, treatment such as polishing, except for degreasing and washing, must not be carried out.

Bi phases are present on the surface in various forms as shown in Cases 1 and 2, where the surface of machined, degreased and then washed parts is observed under an electron microscope. Various patterns are detected. The area of these patterns is calculated as a relative value to the area of the entire sample surface, thereby providing the areal ratio of exposed Bi.

A sample was machined under feed speed condition A shown in Table 1. The thus-prepared surface of the sample (areal ratio of exposed Bi: 12.5%) was observed under a microscope and is shown in an upper photograph of FIG. 7. The lower half of FIG. 7 represents a binary illustration of the upper photograph.

The same sample was machined under feed speed condition B shown in Table 1. The surface of the sample (areal ratio of exposed Bi: 0.3%) was observed under a microscope and is shown in a photograph in FIG. 8. The lower half of FIG. 8 represents a binary illustration of the upper photograph.

The morphology of Bi phases on the wrought surface of Cu—Bi based sliding parts is now described. Detection of Bi under an electron microscope is also described.

Bi phases are formed in the grain boundaries of Cu particles during sintering of a Cu—Bi based alloy. In a composition with an optional additive element(s), when Ag and Bi are added together, they are present as an Ag—Bi eutectic phase. Although there are a variety of Bi in terms of morphology, since Bi is virtually not dissolved in solid Cu, Bi is detected as a Bi phase, which is distinct from other phases. In addition, when hard particles are added, the hard particles and liquid Bi phases formed during sintering are present at identical sites. The structure of the sintered material is just as described above. Specifically, hard particles and Bi phases are distinguishable to one another by electron microscopy of the sintered material. After sintering, various structures are formed as described above. When one pays attention to only Bi phases, their structure is as shown in FIGS. 1 through 6. The proportion of the Bi phases relative to the machined surface can be obtained as the areal ratio of the exposed Bi.

The areal ratio of the Bi phases on a wrought surface is defined as the areal ratio of exposed Bi. An areal ratio of exposed Bi may be obtained with respect to an inner cross sectional structure. In many cases, this ratio on the wrought surface of a material is different from that on an areal ratio of exposed Bi in the interior of the identical material.

The present inventors measured the areal ratio of exposed Bi of a number of bushes. The results are classified by the Bi content and are shown in the following Table. As is apparent from the Table, the areal ratio of the exposed Bi may remain in a very low level no matter how the Bi content of Cu—Bi based sintered parts is high. As seen in this Table, even if the Bi content is as high as 10% or more, when the feed speed condition is B, almost all show the situation of Case 2. That is, a number of Bi phases are covered with Cu deformed by machining, so that the areal ratio of exposed Bi becomes unexpectedly extremely low.

TABLE 1

| Bi Content (Mass %) | Areal Ratio of Exposed Bi (Feed Speed Condition A) | Areal Ratio of Exposed Bi (Feed Speed Condition B) |
|---|---|---|
| 1~2 | 0.5~1.7 | 0.2 |
| 3~5 | 1.0~12.5 | 0.3 |
| 6~10 | 2.5~10.0 | 0.4 |
| 11~15 | 8.5~22.6 | 0.4 |

Cutting Condition
Machine: lath
Material of Cutting Tool: sintered diamond
Inner Diameter of Bush: 30 mm
Revolution Number: 970 r.p.m.
Feed speed A: 0.5 mm/rev. or more
Feed Speed B: 0.01 mm/rev. or less
Sintering Method In producing a Cu—Bi based sintered material, Cu—Bi powder having a particle diameter of 150 μm or less is sprayed on a backing steel and is sintered at 700-1000 degrees C. in an inert protective atmosphere. The Cu—Bi powder is prepared by mixing Cu powder and Bi powder so as to provide a predetermined composition. The amount of Bi and temperature condition of sintering are adjustable. When an additive element such as P or hard particles and solid lubricant are blended, they are mixed with a copper alloy, followed by sintering.

Working Method

Sintered particles form convexities and concavities on the surface of a sintered product. A surface of a sintered product is pressed down by rolls of a rolling mill or the like. The convexities and concavities are pressed by rolls of a mill or the like, and hence the density of the sintered product is enhanced. Usually, a sintered product is machined with a cutting tool or the like to adjust the size and surface roughness. Thus, a sliding member is provided. The Cu matrix may have various metallographic structures; e.g., pure Cu, or Cu with solute Sn, Ni or the like. A Cu—Sn based intermetallic compound may be dispersed in the Cu matrix on the post-cutting surface, from which material is shaved off. Proportion of the Cu matrix to Bi phases, i.e., flowable material, on the post-cutting surface is dependent upon the machining condition. This is believed to be a reason why the areal ratio of exposed Bi varies depending upon the machining condition, notwithstanding the identical Bi content of a sintered alloy. Specifically, it turned out that Bi is more liable to flow and cover the cut surface as the feed speed of a cutting tool is higher. When the feed speed is very low for example feed speed condition B of Table 1, the resultant areal ratio of exposed Bi is low.

The post-working Cu—Bi based sintered parts are used as is. However, a metallic overlay such as Sn and a resinous overlay exhibiting conformability may be applied, if necessary. In the case of using the post wrought parts with an overlay, the areal ratio of exposed Bi is that of the machined surface before applying an overlay.

Now, a reason for limiting the areal ratio of exposed Bi in the present invention is described. FIG. 9 shows plots indicating the relationship between the areal ratio of exposed Bi or Pb and the seizure surface pressure of sintered material parts. The sintered-alloy compositions of the test samples are given below. The test samples were machined to provide a surface roughness of $Rz_{JIS}$ 2-3 μm. However, the feed speed was mainly adjusted, and the cutting speed and the shape of a cutting tool were finely adjusted, thereby changing a proportion of Case 1 to Case 2 hence the areal ratio of exposed Bi.
● (black circle): Cu-3% Sn-7% Bi
◇ (white rhombic): Cu-3% Sn-23% Pb
△ (white triangle): Cu-3% Sn As is apparent from FIG. 9, the areal ratio of exposed Bi and the seizure resistance are co-related. Machining may result in very low areal ratio of exposed Bi, then, the seizure surface pressure is low. When machining results in high areal ratio of exposed Bi, the seizure surface pressure becomes high. Bi plastically flows under a cutting tool and covers the surface of sintered material. Such Bi also contributes to the enhancement of seizure resistance. In addition, the seizure surface pressure abruptly increases at 0.5% or more of areal ratio of exposed Bi. Therefore, the present invention is based on the discoveries described above, and does not specify the amount of an additive element Bi or the Bi content as in the conventional sintered material, but specify the areal ratio of exposed Bi of sliding parts. In addition, 0.5% of areal ratio of exposed Bi mentioned above is employed as a characteristic of the Cu—Bi based sliding parts according to the present invention. The seizure surface pressure arrives at an almost constant level at an areal ratio of exposed Bi of approximately 3%. Therefore, even when the Bi content is increased higher, effects commensurate with an amount of addition are not obtained. The virtually constant seizure surface pressure level mentioned above is almost in agreement with the properties of conventional Cu—Pb based materials. It turns out therefore that the properties of a Pb-free Cu—Bi based sintered alloy are equivalent to those of a Cu—Pb based material.

The present invention attains the following effects as described hereinabove.

(a) Seizure resistance can be improved by controlling the areal ratio of exposed Bi of Cu—Bi based sintered sliding parts.

(b) The amount of Bi phases exposed on the surfaces of parts (areal ratio of exposed Bi) can be increased even when the amount of Bi is low. The seizure resistance can thus be improved.

(c) A seizure resistance equivalent to that of a conventional Cu—Pb based sintered material can be attained.

(d) When the amount of Bi in a Bi-based sintered material is increased, seizure resistance is enhanced but on the other hand the fatigue resistance, strength and wear resistance are impaired. Since wear resistance is improved at a small amount of Bi, such properties as fatigue resistance can be maintained at an excellent level.

BEST MODE FOR CARRYING OUT THE INVENTION

Examples and Comparative Examples

An atomized copper-alloy powder having a composition shown in Table 2 and a particle diameter of 150 μm or less was sprayed on a backing steel sheet to a thickness of 1 mm. The atomized powder was sintered at 850 degrees C. for 20 minutes. The sintered material was then rolled and was again rolled and sintered under the same conditions. The sintered material in the form of bimetal was obtained and bent to a bush form having an inner diameter of 50 mm. The inner surface of a bush was wrought with a sintered diamond cutting tool. The areal ratio of exposed Bi as measured on the inner surface of the bush and the seizure resistance are shown in Table 2.

is cut to show a cross section. The photograph shows Case 1, in which Bi phases are elongated on to the surface of Cu matrix.

FIG. 4 A schematic illustration of FIG. 3.

FIG. 5 A micro-structural photograph showing a surface of a Cu—Bi sliding part. The surface of this part is machined and is cut to show a cross section. The photograph shows Case 2, in which Cu is elongated on to the surface of Bi phases.

TABLE 2

| | | Components, mass % | | | | | | | | | | Areal Ratio of Exposed Bi % | Seizure Surface Pressure MPa |
|---|---|---|---|---|---|---|---|---|---|---|---|---|---|
| | | Matrix | | | | | | Hard Particles | | Others (Solid Lubricant) | | | |
| A | No. | Bi | Sn | Ni | P | In | Zn | Ag | Kind | Amount | Kind | Amount | | |
| B | 1 | 1 | 6 | — | — | — | — | 0.12 | — | — | — | — | 0.5 | 6 |
| | 2 | 1 | 6 | — | — | — | — | 0.10 | — | — | $MoS_2$ | 2 | 1.1 | 8 |
| | 3 | 1 | 10 | — | — | — | — | 0.15 | $Fe_3P$ | 2 | Graphite | 1 | 1.2 | 7 |
| | 4 | 1 | — | — | — | 5 | — | 0.10 | — | — | — | — | 0.8 | 10 |
| | 5 | 1 | 3 | — | — | 5 | — | 0.12 | $SiO_2$ | 3 | — | — | 1.7 | 12 |
| | 6 | 5 | 3 | — | — | — | — | 0.16 | $Fe_3P$ | 5 | — | — | 1.5 | 18 |
| | 7 | 5 | 6 | — | 0.2 | — | — | 0.16 | $Fe_3P$ | 1 | $MoS_2$ | — | 3.8 | 17 |
| | 8 | 5 | 6 | — | — | — | — | 0.14 | $Fe_3P$ | 3 | — | — | 4.9 | 14 |
| | 9 | 5 | 6 | 5 | — | — | — | 0.3 | AlN | 1 | — | — | 4.9 | 14 |
| | 10 | 5 | 8 | 3 | — | — | — | — | NiB | 3 | — | — | 6.2 | 15 |
| | 11 | 5 | — | — | — | — | 23 | 0.5 | — | — | — | — | 5.1 | 14 |
| | 12 | 5 | 10 | — | — | — | — | — | — | — | — | — | 12.5 | 12 |
| | 13 | 7 | 3 | — | — | — | — | 0.2 | — | — | — | — | 2.5 | 20 |
| | 14 | 7 | 8 | — | — | — | — | 0.3 | FeB | 2 | — | — | 6.4 | 19 |
| | 15 | 7 | 8 | 2 | — | — | — | 0.2 | $Fe_3P$ | — | — | — | 7.9 | 16 |
| | 16 | 7 | — | — | — | — | — | — | — | — | — | — | 8.5 | 15 |
| | 17 | 15 | 5 | — | — | — | — | — | — | — | — | — | 22.6 | 14 |
| | 18 | 10 | — | — | — | 5 | — | — | — | — | — | — | 8.2 | 19 |
| | 19 | 10 | 10 | 2 | — | — | — | 0.3 | $Fe_3P$ | 1 | — | — | 4.7 | 16 |
| | 20 | 10 | 10 | — | — | — | — | 0.5 | — | — | — | — | 8.5 | 15 |
| | 21 | 12 | 8 | 3 | — | — | — | — | — | — | — | — | 17.5 | 15 |
| C | 1 | 1 | 6 | — | — | — | — | 0.12 | — | — | — | — | 0.2 | 2 |
| | 2 | 5 | 3 | — | — | — | — | 0.16 | $Fe_3P$ | 3 | — | — | 0.4 | 6 |
| | 3 | 5 | 6 | — | — | — | — | 0.3 | AlN | 1 | — | — | 0.4 | 8 |
| | 4 | 7 | 3 | — | — | — | — | 0.2 | — | — | — | — | 0.3 | 6 |
| | 5 | 7 | 8 | — | — | — | — | 0.3 | FeB | 2 | — | — | 0.4 | 7 |

Remarks:
A - Classification.
B - Examples.
C - Comparative Examples.

It is apparent from Table 2 that a high seizure surface-pressure is obtained in the inventive examples having a ratio of exposed Bi area of 0.5% or more.

INDUSTRIAL APPLICABILITY

As is described hereinabove, although the prior art has proposed various improvements in a Cu—Bi based sliding material, the inventors have continued extensive research on machined sliding parts, and improved sliding parts have now been attained.

BRIEF DESCRIPTION OF DRAWINGS

FIG. 7 A surface is machined under feed speed A in Table 1 (12.5% of Bi exposure surface-areal ratio). The upper half is a microscope photograph. The lower half is a schematic drawing.

Figure 1:
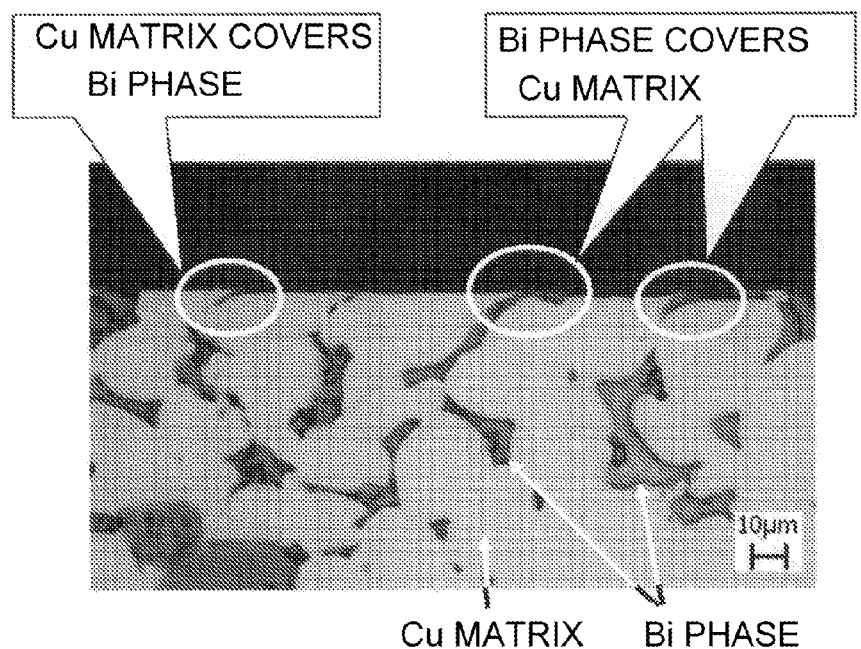
FIG. 1 A micro-structural photograph showing a surface of a Cu—Bi sliding part. The surface of this part is machined and is cut to show a cross section.
Figure 2:
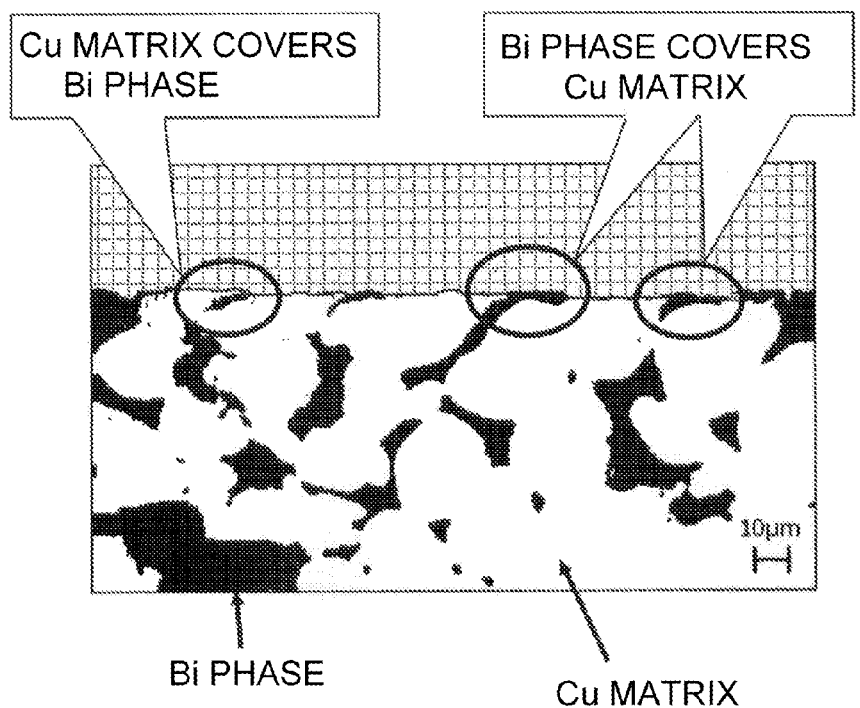
FIG. 2 A schematic illustration of FIG. 1.
Figure 3:
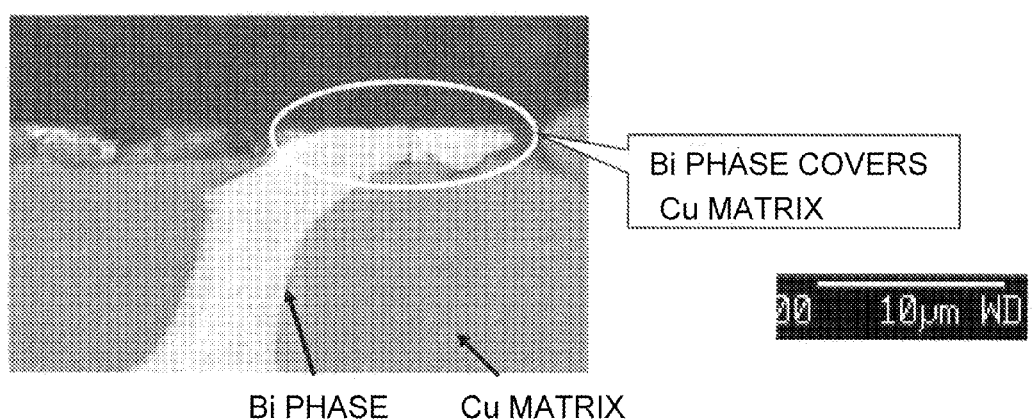
FIG. 3 A micro-structural photograph showing a surface of a Cu—Bi sliding part. The surface of this part is machined and FIG. 6 A schematic illustration of FIG. 5.
Figure 4:
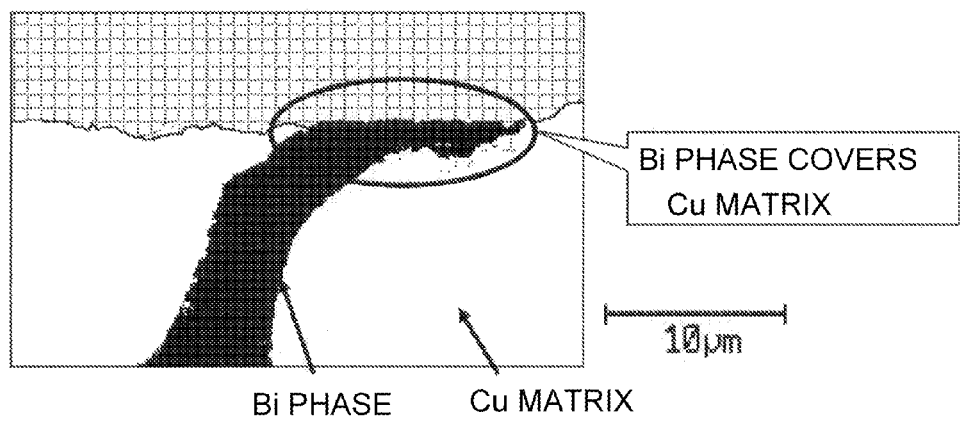
Figure 5:
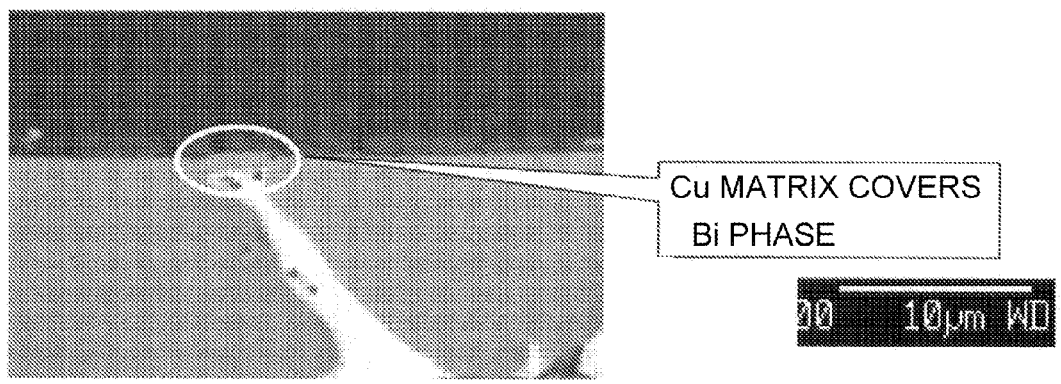
Figure 6:
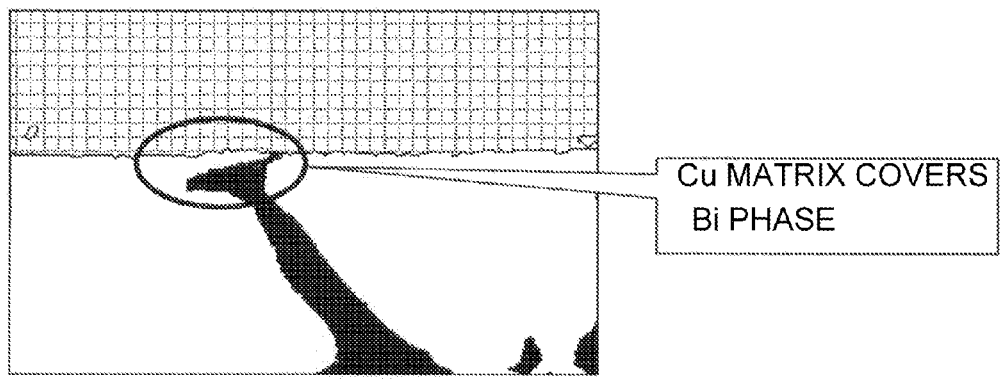
Figure 8:
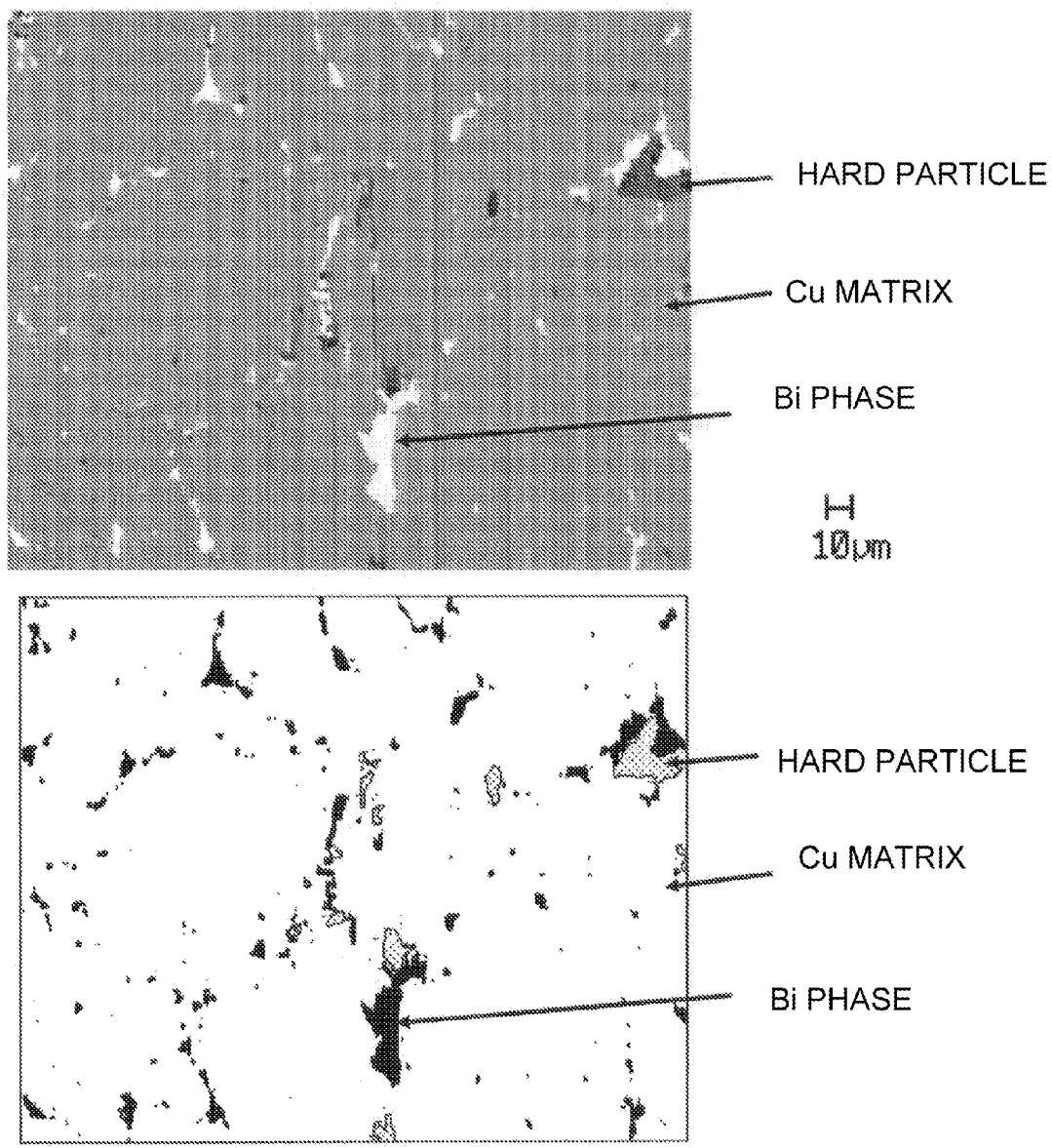
FIG. 8 A surface is of the same specimen as in FIG. 7 machined under feed speed B in Table 1 (0.3% of Bi exposure sure-areal ratio) The upper half is a microscope photograph. The lower half is a schematic drawing.
Figure 9:
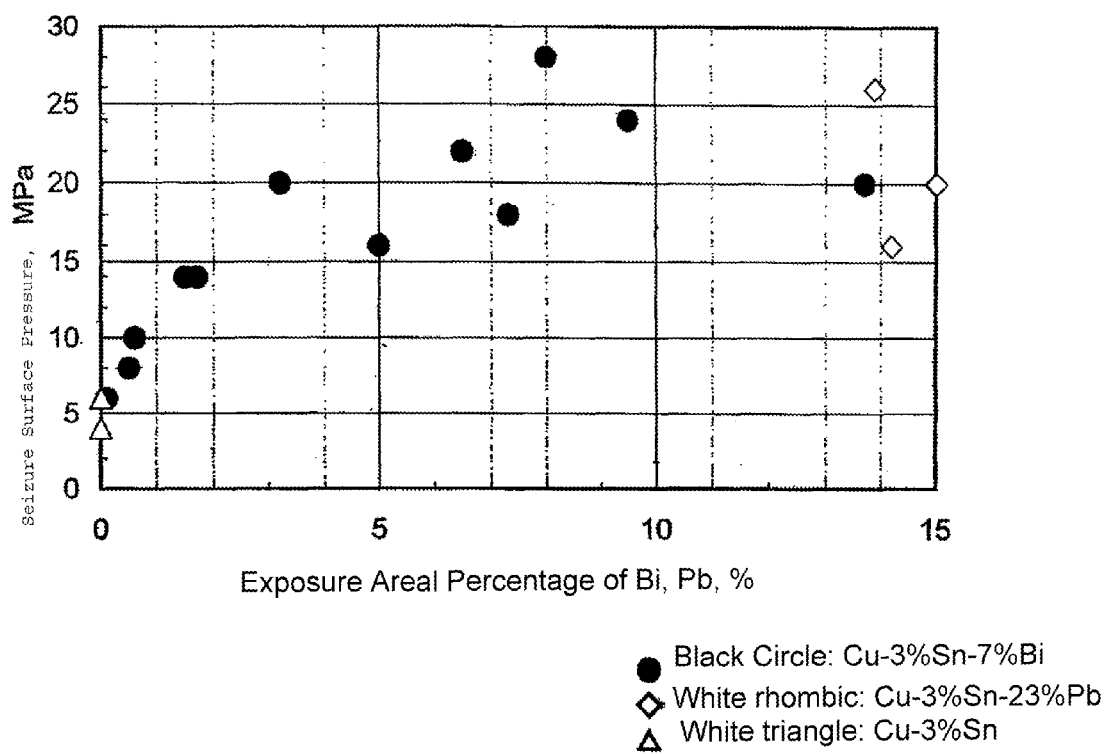
FIG. 9 A graph showing the relationship between the Bi or Pb exposure areal ratio and the seizure resistance of a Cu—Sn based, Cu—Bi based or Cu—Pb based sliding part.

The invention claimed is:
1. A sliding part made of a Pb-free Cu—Bi based sintered sliding material comprising:
    a surface portion brought into contact with a shaft, finished by machining with a cutting tool to approximately Rz JIS (Japanese Industrial Standard) 0.5 to 5 μm of roughness; and containing plastically flown copper and Bi phases; and a bulk portion having a homogeneous sintered structure composed of Cu crystal grains and Bi phases distributed in grain boundaries of Cu crystal grains, on which surface portion, a portion of the Bi phases of the homogeneous sintered structure is covered by said plastically flown copper; and a portion of the Cu crystal grains of the homogeneous sintered structure is covered by said plastically flown Bi phases, wherein a total of the uncovered Bi phases on the finished surface and said plastically flown Bi phases covering a portion of the Cu crystal grains has an area ratio relative to the areal ratio of the finished surface of 0.5% or more when a feed speed of the cutting tool is 0.5 mm/rev or more.

2. A sliding part made of a Pb-free Cu—Bi based sintered material according to claim 1, wherein said machining is performed by means of displacing the cutting tool in a predetermined direction, and further the plastically flown copper and Bi phases occur in said predetermined direction.

3. A sliding part made of a Pb-free Cu—Bi based sintered sliding material according to claim 1 or 2, wherein the Bi content of said Cu—Bi based sintered sliding material is from 0.5 to 15 mass %.

4. A sliding part made of a Pb-free Cu—Bi based sintered sliding material according to claim 3, comprising one or more of 1 to 15 mass % Sn, 5 mass % or less Ni, 5 mass % or less Ag, 0.2 mass % or less P, 10 mass % or less In, and 30 mass % or less Zn, in a total amount of up to 40 mass % or less.

5. A sliding part made of a Pb-free Cu—Bi based sintered sliding material according to claim 4, containing hard particles in an amount of 10 mass % or less.

6. A sliding part made of a Pb-free Cu—Bi based sintered sliding material according to claim 4, wherein an overlay covers the finished surface of the Cu—Bi based sintered sliding material.

7. A sliding part made of a Pb-free Cu—Bi based sintered sliding material according to claim 5, wherein an overlay covers the finished surface of the Cu—Bi based sintered sliding material.

8. A sliding part made of a Pb-free Cu—Bi based sintered sliding material according to claim 4, containing a solid lubricant in an amount of 10 mass % or less.

9. A sliding part made of a Pb-free Cu—Bi based sintered sliding material according to claim 6, containing a solid lubricant in an amount of 10 mass % or less.

* * * * *